United States Patent [19]

Carlier

[11] 3,998,405
[45] Dec. 21, 1976

[54] VACUUM-PRESSURE SENDING AND RECEIVING STATION FOR PNEUMATIC TUBE CARRYING INSTALLATIONS

[75] Inventor: Claude Carlier, Montreuil, France

[73] Assignee: Societe Anonyme Saunier Duval, Montreuil, France

[22] Filed: Nov. 26, 1975

[21] Appl. No.: 635,767

[30] Foreign Application Priority Data

Nov. 27, 1974 France .............................. 74.38783

[52] U.S. Cl. .................................. 243/19; 243/20; 243/28
[51] Int. Cl.² ......................................... B65G 51/26
[58] Field of Search ................... 243/19, 20, 28, 31

[56] References Cited
UNITED STATES PATENTS 3,767,138  10/1973  Martin ............................... 243/28

FOREIGN PATENTS OR APPLICATIONS 2,205,332  8/1973  Germany .......................... 243/19

*Primary Examiner*—Evon C. Blunk
*Assistant Examiner*—Jeffrey V. Nase
*Attorney, Agent, or Firm*—Cameron, Kerkam, Sutton, Stowell & Stowell

[57] ABSTRACT

The present invention relates to a sending and receiving station for a pneumatic transporter. A cartridge carrying tube is located at the point of arrival of a vertical terminal line during sending while it is inclined during reception with a lateral wall deflecting containers which arrive at the station. Turning movement of the tube is controlled by a pivoting valve which acts on an external edge of the tube to place it in vertical position for sending. The present invention is used at receiving and sending stations functioning under vacuum-pressure.

7 Claims, 1 Drawing Figure

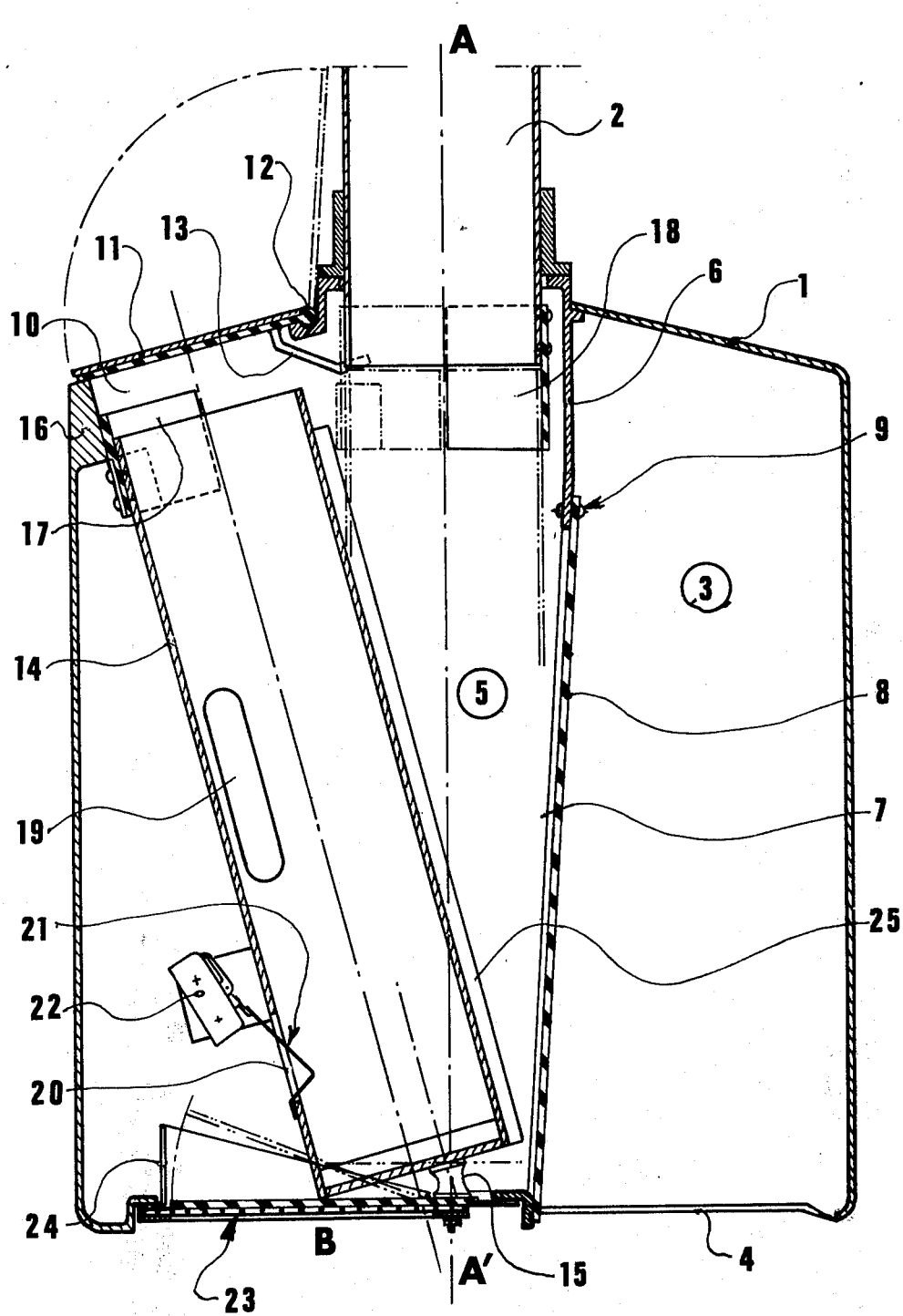

VACUUM-PRESSURE SENDING AND RECEIVING STATION FOR PNEUMATIC TUBE CARRYING INSTALLATIONS

BACKGROUND OF THE INVENTION

The present invention relates to a new sending and receiving station functioning under the principal known as "vacuum-pressure" for a pneumatic transporting system.

It is well known to utilize a receiving or sending station in a branch of a principal transporting line locating it for example, on a branch controlled by a sealing valve. It is also known that such an arrangement utilizes the known principle of vacuum-pressure meaning that an arriving container arrives at the station because of a high pressure in the principle line and, inversely, that the container leaves the station by being subjected to an aspiration (the derivation is "in vacuum") occurring in the principle line.

Applicant's French Patent No. 2,110,537 discloses a sending and receiving station for containers having a container carrying magazine of rectangular form disposed beside the vertical terminal section of a branch line, the magazine rotating at the time of sending of the container around a horizontal axis so that the container can be drawn upwardly when one of its extremities engage in the section of the line. The vacuum created upstream during sending causes the rotation of the magazine while the magazine remains vertical during receiving, the containers can then leave the station by a vertical terminal section of the branch of the line which is closed at its lower end by a valve.

This arrangement of rotating magazine has certain disadvantages in operation essentially due to the fact that on sending the container frequently catches on the edge of the upstream line and losses of air in this area sometimes prevent rotary movement of the magazine.

In applicant's French Patent No. 2,225,366 another station is described which utilizes the decrease of pressure in the station during sending to cause rotation of the tube utilizing a piston at the base of the tube connected in the direction of rotation of the tube and there is a decrease of pressure in the tightly closed enclosure. A series of small rods transmits the movement of the piston to the tube.

This station is relatively large and costly because of the mechanical connections (rods *** positioning of the piston) and this has caused applicant to invent the present novel vacuum-pressure sending station based on an entirely different principle while utilizing the known principle of the lowering of pressure created in the tube during sending as the motor element for pivoting the tube.

SUMMARY OF THE INVENTION

In accordance with the present invention the container carrying tube is located in a sealed enclosure at the arrival end of the vertical terminal line, that is, the tube is in vertical position and aligned with this line during sending while it is inclined on its horizontal axis during receiving, its lateral edge serving to deflect the arriving containers in the station. The rotary movement of the tube is controlled by a pivoting valve mounted over a lower opening provided in the sealed enclosure and the valve acts on an external edge of the tube to move it into vertical position during sending.

DESCRIPTION OF THE ACCOMPANYING DRAWINGS

Other characteristics and advantages of the present invention will appear from the following description of a preferred embodiment thereof as shown in the single FIGURE of the accompanying drawing which FIGURE is a vertical section of the sending and receiving station.

DESCRIPTION OF THE PREFERRED EMBODIMENT

With reference to the accompanying drawing, the station there shown includes a housing 1 connected to the pneumatic transport line by tube 2 which opens at its upper end. A receiving chamber 3 at the right in the figure opens at its base 4 on a receiver provided with shock absorbing means and is separated from the sending chamber 5 by an intermediate wall 6 having an opening 7. A flexible flap 8 fixed at top 9 on wall 6 covers the opening on the reception chamber side and provides sealing between it and chamber 5.

The top of enclosure 1 is provided adjacent tube 2 with a circular opening 10 closed by a valve 11 shown in closed position which can pivot around axis 12 to the open position shown in broken line. A safety arm 13, the function of which will be explained below, is fixed to and under valve 13.

Mounted within chamber 5 is a container sending tube 14 closed at its lower end and fixed at its base to the bottom of enclosure 1 by a flexible rubber articulation 15. Tube 14 can take a vertical position along the axis A-A' of tube 2 of the line or an inclined position in which its upper opening is opposite orifice 10.

Tube 14 is centered with respect to opening 10 by a circular shoulder 16 forming a part of enclosure 1 and located adjacent opening 10. Tube 14 is provided with a half circular joint 17 disposed to come into engagement with tube 2 when tube 14 is in vertical position. A half circular joint 18 is disposed opposite joint 17 and is carried by the end of tube 2 and extends into the interior of chamber 5 to receive tube 14 when in vertical position with the two joints 17 and 18 cooperating to form a seal around tube 14. Tube 14 is provided with lateral openings 19 for the passage of air and near its base with an opening 20 in which extends a spring 21 connected to a switch 22 acting as a feeler for detecting the presence of a container resting in tube 14. Tube 14 is provided along its entire length adjacent chamber 3 with a reinforcing plate 25.

Another valve 23 for the admission air is mounted for rotation on the bottom of the enclosure adjacent articulation 15 and opens into the chamber 5. In the position shown in solid line in the drawing, valve 23 is normally applied adjacent its middle portion at point B to the lateral exterior edge of tube 14. A housing 24 surrounds valve 23 and limits the passage of free air by valve 23 when valve 23 moves from the position shown in solid line to the position shown in broken line when container tube 14 is in vertical position.

The preferred embodiment described above operates as follows:

When the station is to function for receiving a container as when a container arrives from the line into tube 2 there is upstream pressure and valve 23 is closed and tube 14 occupies the inclined position shown in the FIGURE. The container enters enclosure 1, strikes the reinforcing plate 25 on the edge of container tube 14 and is directed toward chamber 3 opening the flexible flap 8 which is in semi-open position within chamber 3 because of the current of air caused upstream by the container which enters the enclosure and creates an increase of pressure in chamber 5 with respect to the atmospheric pressure in chamber 3. The container then falls through opening 4. During the receiving operation a container can be placed in tube 14 to await sending. Valve 11 can be opened for this purpose without difficulty. Contact 22 transmits to the control center an indication that a container is waiting so that sending can be carried out when reception of the preceding container is completed.

When the station is to send, the line is in vacuum, and the drop in pressure created in line 2 holds flap 8 against its seat since chamber 5 is at low pressure with respect to chamber 3. The container awaiting sending in tube 14 is in an inclined position and valve 11 is closed. Under the effect of reduced pressure in chamber 5, valve 23 tends to open and bears against the base of tube 14 at point B causing tube 14 to pivot around axis 15. Wall 24 limits the amount of air passing from the exterior to the interior of the enclosure and consequently the force exerted on tube 14 by valve 23 is large at the beginning of the sending operation. On the other hand, the more valve 23 raises, the more the loss of air between it and wall 24 increases, that is, the reduction of pressure occurs more and more rapidly in chamber 5. Tube 14 moves rapidly to vertical position opposite tube 2 facilitated by the flow of air which forces joints 17 and 18 against each other. The pivoting movement is solely due to the effect of the circulation of air necessary for transporting the container. Further, the air admitted by openings 19 establishes a reduction of pressure in tube 14 above the container which causes the container to move into tube 2 and the line. Following this there is a termination of the reduction of pressure and tube 14 returns to its first position by gravity due to its weight and because articulation 15 is slightly off center with respect to the axis of tube 2.

To introduce a container to be sent before creating a vacuum in the line, it is sufficient to open valve 11 for access to tube 14. If the operator attempts to carry out this operation when tube 14 is in sending position, security arm 13, having an extremity in the form of an inclined collar, bears against tube 14 in vertical position and will engage tube 14 and prevent opening of valve 11. Security arm 13 is free only when tube 14 is in the inclined position.

Flexible articulation 15 is cheap and simple to use and requires no precise adjustment of position of tube 14. Tube 14 in the inclined position is centered by shoulder 16 and in vertical position is centered by the semi-circular joints 17 and 18.

The above described preferred embodiment of the present invention can be varied in construction details without departing from the present invention concept.

What I claim is:

1. A vacuum-pressure sending and receiving station for pneumatic line transporting systems comprising a sealed enclosure, a container carrying tube disposed in said sealed enclosure at the end of a vertical terminal section of a pneumatic transporting line, said container carrying tube rotating on a horizontal axis during sending of the container bringing the container into a substantially vertical position opposite the vertical terminal section of the transporting line, said container carrying tube occupying during sending a vertical position in extension of the vertical terminal section of the transporting line and during reception an inclined position, said sealed enclosure having a lateral opening, a flexible flap closing said opening, a base for said enclosure, an opening in said base, an air admission valve mounted in said opening in said base of said sealed enclosure engaging and rotating said container carrying tube, said air admission valve opening only by the circulation of air required for transporting the container.

2. A sending and receiving staion as described in claim 1, including a flexible articulation connecting said container carrying tube to said base and acting as said horizontal axis.

3. A sending and receiving station as described in claim 2, said flexible articulation being off center with respect to a long axis of said container carrying tube.

4. A sending and receiving station as described in claim 2, said air admission valve in said base of said enclosure being articulated on said base adjacent said flexible articulation and opening into said enclosure and bearing against a lower lateral edge of said container carrying tube and driving said container carrying tube in its pivotal movement.

5. A sending and receiving station as described in claim 4, including a wall surrounding opening in said base and said admission valve limiting the amount of air admitted in said enclosure during pivotal movement of said container carrying tube.

6. A sending and receiving station as described in claim 1, including an opening in said enclosure above said container carrying tube, a valve closing the opening in said enclosure above said container carrying tube when said container carrying said tube is in inclined position and a safety arm secured to said valve preventing opening of said last named valve when said container carrying tube is in the vertical position.

7. A sending and receiving station as described in claim 1, said container carrying tube including a semi-circular annular joint element, a corresponding semi-circular annular joint element mounted on an end of said vertical terminal section of the line, said semi-circular annular joint elements being in engagement during sending of a container.

* * * * *